Nov. 13, 1945.   R. H. TAYLOR   2,388,940
SOLAR HEATER
Filed May 8, 1944
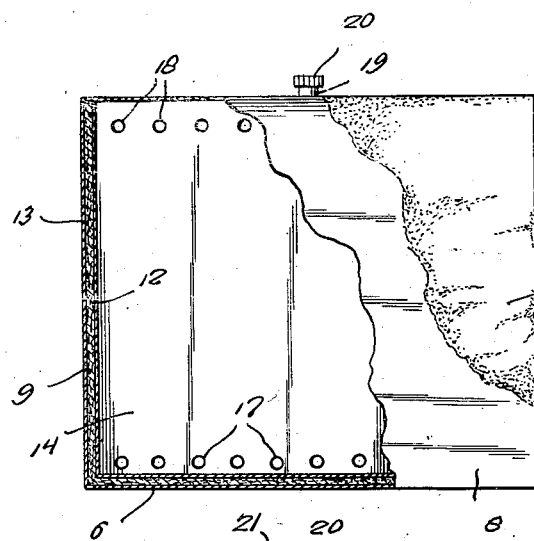
Fig. 1.
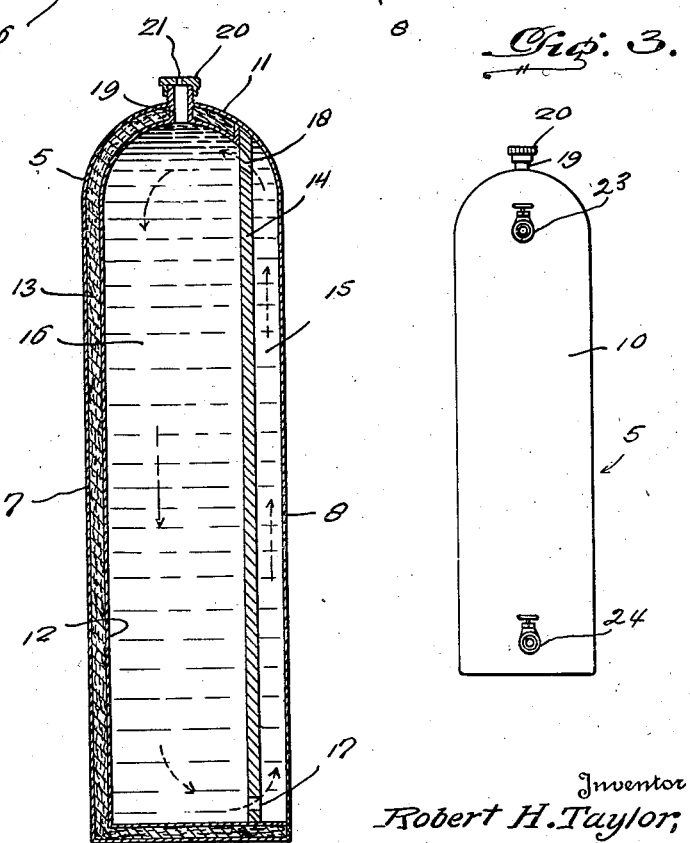
Fig. 2.
Fig. 3.
Inventor
Robert H. Taylor,
By McMorrow and Berman
Attorneys Patented Nov. 13, 1945

2,388,940

UNITED STATES PATENT OFFICE 2,388,940

SOLAR HEATER

Robert H. Taylor, Mayfield, Ky.

Application May 8, 1944, Serial No. 534,633

2 Claims. (Cl. 126—271)

The present invention relates to new and useful improvements in room heaters, and more particularly a solar heater designed primarily to utilize the heat rays from the sun to assist in home heating after sundown or during parts of the day when the sun is not shining.

An important object of the present invention is to provide a self-contained solar heater of this character comprising a tank adapted to contain water or other liquids, and including a heater chamber and a storage chamber having open communication with each other and in which the water heated in the heater chamber is utilized to circulate the water through both chambers to raise the temperature thereof when the heater chamber is subjected to the rays of the sun and to radiate heat from the tank for a predetermined period after being subjected to the influence of the sun.

A further important object of the invention is to provide a solar heater of this character adapted for use as a domestic hot water heater.

A still further object is to provide a device of this character simple and practical in construction, which is efficient and reliable in performance, relatively inexpensive to manufacture and install in operative position and otherwise well adapted for the purposes for which the same is intended.

Other objects and advantages reside in the details of construction and operation as more fully hereinafter described and claimed, reference being had to the accompanying drawing forming part hereof, wherein like numerals refer to like parts throughout, and in which:

Figure 1 is a view in elevation with parts broken away and shown in section.

Figure 2 is a vertical transverse sectional view showing the device constructed for use as a room heater.

Figure 3 is a similar view showing the device constructed as a domestic hot water heater.

Referring now to the drawing in detail, wherein for the purpose of illustration I have disclosed a preferred embodiment of the invention, the numeral 5 designates a tank preferably constructed of copper, aluminum or other good heat conducting material, the tank being of relatively narrow elongated construction and including a bottom 6, rear wall 7, front wall 8, end walls 9 and 10 and a rounded top 11.

Positioned in the tank is a liner 12 spaced from the bottom 6, rear wall 7 and top 11 and between the liner and the said walls of the tank is packed a suitable insulation material 13.

A partition 14 is positioned in the tank adjacent the front wall 8 and in spaced relation therefrom to provide a relatively narrow heating chamber 15 at the front of the tank and a relatively larger storage chamber 16 between the partition 14 and the rear of the tank, the partition 14 extending from the top to the bottom of the tank and from one end wall to the other thereof.

Openings 17 are formed adjacent the bottom of the partition at spaced intervals and similar openings 18 are formed adjacent the top of the partition.

The top of the liner 12 is formed with a filler neck 19 which extends outwardly through the top 11 and is provided at its upper end with a threaded cap 20 having a vent opening 21 therein.

The outer surface of the front wall 8 is coated with a dull black paint or other substance 22 (see Figure 1) possessing goods heat-absorbing qualities and in the operation of the device the chambers 15 and 16 are filled with water or other suitable liquid and the front wall 8 thereof then placed in a position for exposure to the rays of the sun. The device may be placed in a room or other desired location.

When the heating chamber 15 is subjected to the rays of the sun, the water therein will become quickly heated and cause a circulation thereof through the chambers 15 and 16, as indicated by the arrows in Figure 2 of the drawing. The temperature of the water will thus be raised in accordance with the heat-generating power of the sun and after the sun has gone down, or the heater otherwise is relieved of the influence of the sun, the water in the chamber 15 will cool more quickly than the water in the chamber 16 and thus the circulation of the water will be reversed and the relatively warm water contained in the chamber 16 will then go back through the upper openings 18 in the partition 14 and downwardly into the chamber 15 for utilizing the heat therefrom for heating the room by radiation from the non-insulated wall 8.

In Figure 3 of the drawing I have illustrated a heater adapted for attaching inlet and outlet pipes 23 and 24 thereto for connection in a hot water heating system and by means of which the water heated in the tank may be used for domestic purposes. When used in this manner, the tank 5 is preferably placed on the roof of a building and the filler neck 19 and cap 20 may then be omitted.

It is believed the details of construction, operation and advantages of the device will be readily understood from the foregoing without further detailed explanation.

Having thus described the invention, what I claim is:

1. A solar heater comprising a substantially rectangular, relatively narrow tank of substantial height and length, arranged and adapted to contain a liquid to be heated, said tank being positioned in use with one of its narrow sides lowermost and the opposite narrow side uppermost, one of the major outer walls of the tank being heat conductive and exposed to the rays of the sun and all of the other outer walls of the tank having inner linings spaced therefrom with a filler of insulation material therebetween, and a partition located in said tank in relatively close spaced relation to said heat conductive wall but in greater spaced relation to the opposite major insulated wall so as to provide a relatively narrow heating chamber and a storage chamber of substantial width and capacity, said partition having openings therethrough adjacent its opposite upper and lower sides for the circulation of the contained liquid in the tank from one of said chambers to the other.

2. A solar heater comprising an upright, substantially rectangular, relatively narrow tank of substantial height and length, arranged and adapted to contain a liquid to be heated, said tank being positioned in use with one of its narrow sides lowermost and its opposite narrow side uppermost, one of the major upstanding outer walls of the tank being heat conductive and without insulation and all of the other outer walls of the tank having inner linings spaced therefrom with a filler of insulation material therebetween, and a partition located in said tank in relatively close spaced relation to said heat conductive wall but in greater spaced relation to the opposed major upright wall so as to provide a relatively narrow heating chamber and a storage chamber of substantial width and capacity, said partition having a plurality of horizontal aligned openings adjacent its upper and lower sides, respectively, for circulation of the contained liquid in the tank from one of said chambers to the other.

ROBERT H. TAYLOR.